Jan. 18, 1966 F. J. LOCK 3,230,004
SWIVEL HOOK ARRANGEMENT FOR HOIST
Filed March 24, 1964 2 Sheets-Sheet 2
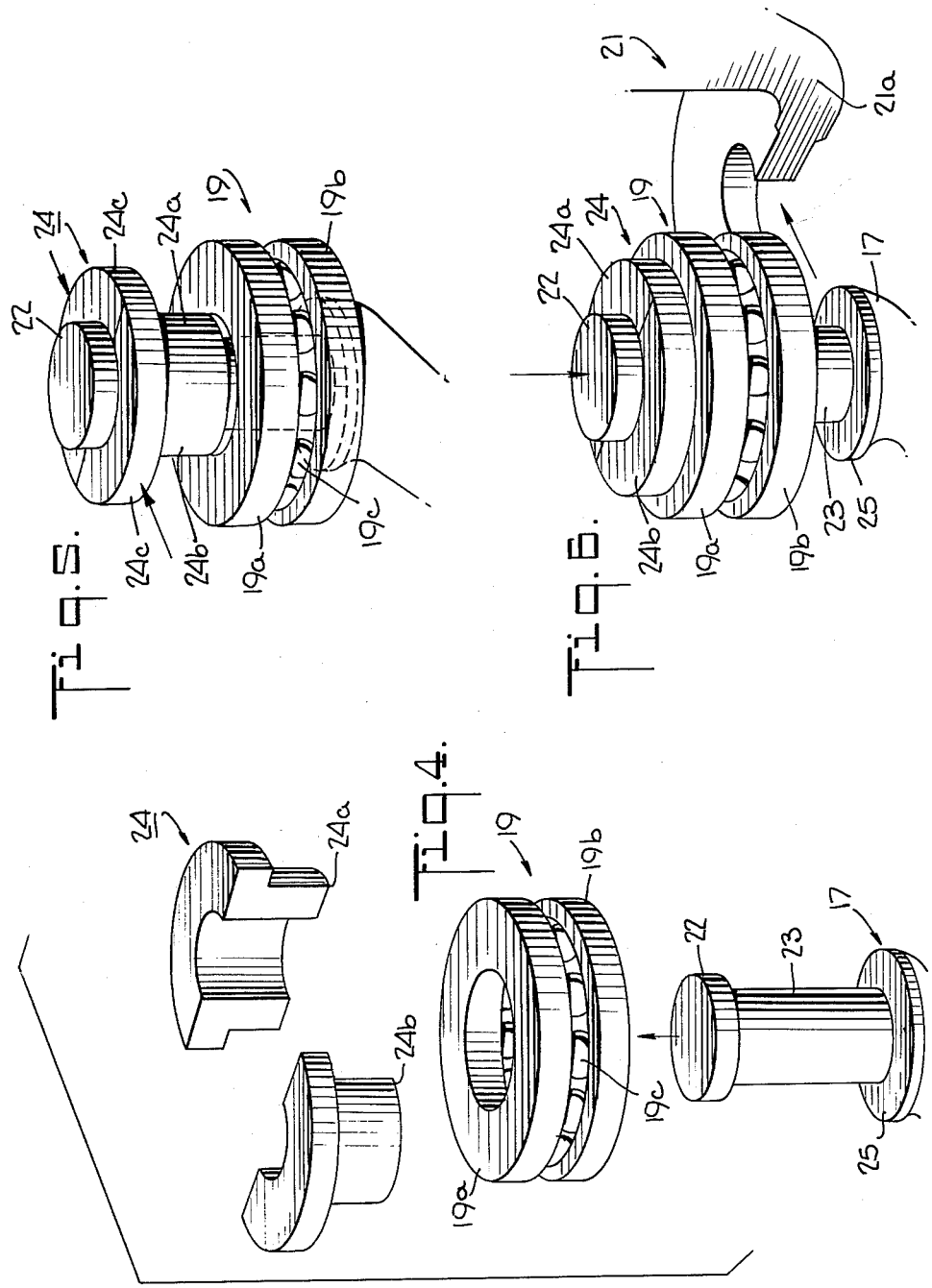
INVENTOR.
FRANK J. LOCK
BY
ATTORNEY

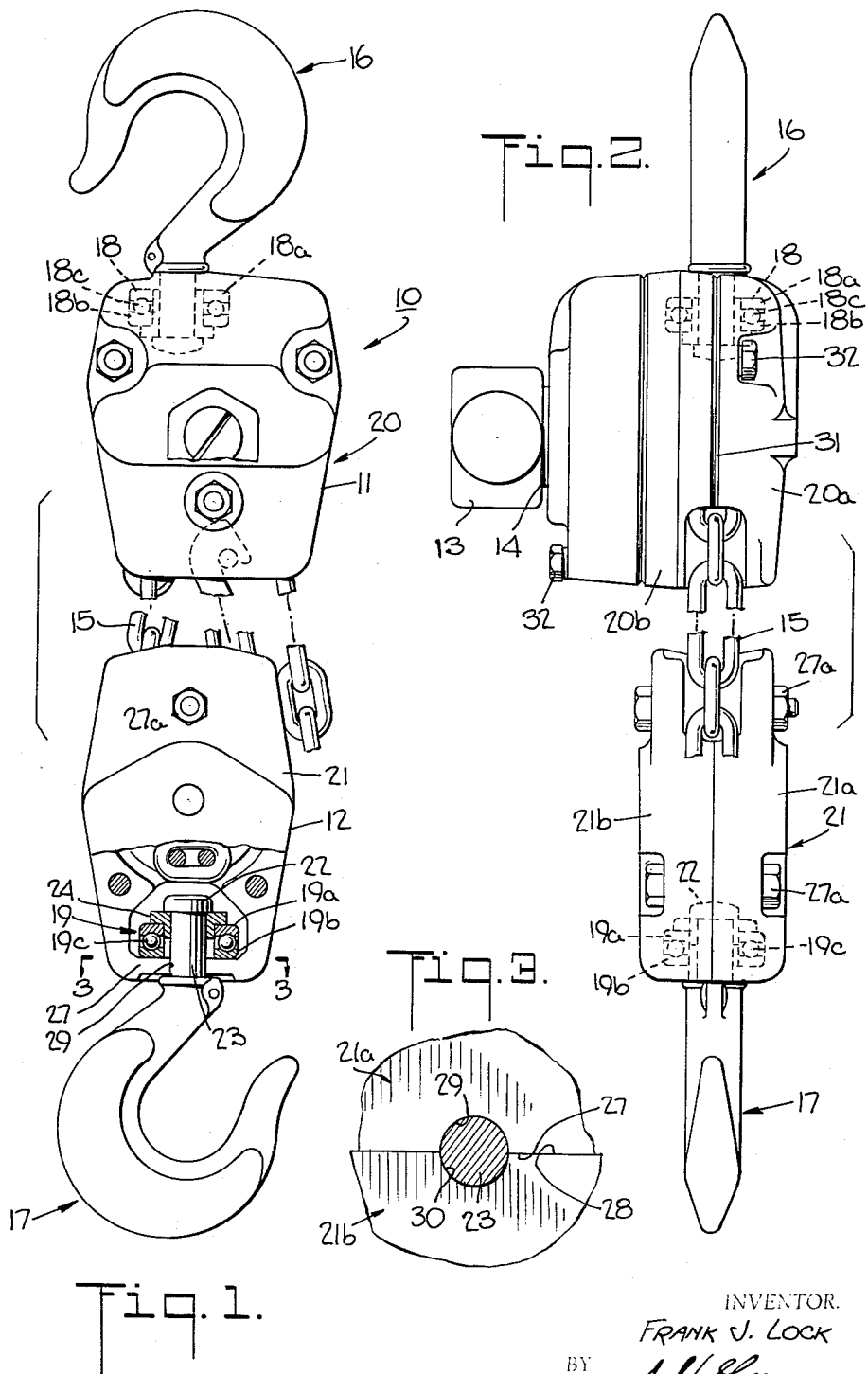

United States Patent Office 3,230,004
Patented Jan. 18, 1966

3,230,004
SWIVEL HOOK ARRANGEMENT FOR HOIST
Frank J. Lock, Philadelphia, Pa., assignor to Yale & Towne, Inc., New York, N.Y., a corporation of Ohio
Filed Mar. 24, 1964, Ser. No. 354,239
2 Claims. (Cl. 294—78)

This invention relates to a hoist having a supporting hook which may swivel relatively to the hoist casing to allow rotation of a load supported by the hoist.

Swivel hooks for hoists of this type are either formed with integral heads on the ends of the shanks thereof for attaching the hook to the casing or provided with nuts threaded on the ends of the shanks for this purpose. While a hook having an integrally formed head on the shank is superior from the viewpoint of strength and cost, the use thereof has been limited to light duty hoists which do not require anti-friction thrust bearings of the roller or ball type between the head and the casing to reduce friction as no satisfactory arrangement has heretofore been devised for assembling an anti-friction bearing of the ball or roller type to this type of hook.

The purpose of this invention is to provide a simple, inexpensive arrangement whereby an anti-friction bearing of the roller or ball type may be used with a hook having an integral head formed on the end of the shank thereof, and the bearing and hook quickly and easily assembled to the hoist casing.

In accordance with the invention, an anti-friction bearing having an inner diameter slightly larger than the integral head of the shank of the hook is used. The anti-friction bearing is first slipped over the integral head on the shank of the hook onto the shank, and a split, flanged bushing then applied to the shank of the hook with the bushing extending into the space between the inside of the bearing and the shank, and the flange of the bushing extending over the side of the bearing and under the integral head of the hook, whereby thrust is transmitted from the bearing to the head of the hook. The hook, bearing and bushing, are then assembled between two halves of a hoist casing, with opposed portions of the walls of the casing encompassing the shank of the hook at one side of the bearing, whereby when the halves of the casing are secured together, the split bushing is locked against axial displacement and disassembled from the anti-friction bearing and the shank of the hook. In this manner, the advantages of a hook having an integral head and the advantages of the use of an anti-friction bearing are obtained.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

In the drawing:

FIG. 1 is a front elevational view, with parts broken away, of a hoist incorporating the swivel hook arrangement of the invention in both the power input or actuating portion of the hoist and the block portion of the hoist;

FIG. 2 is a side elevational view of the hoist shown in FIG. 1;

FIG. 3 is a sectional view taken on the line 3—3 of FIG. 1;

FIG. 4 is an exploded, perspective view of the parts of the swivel connection for the hook;

FIG. 5 is a perspective view showing the assembly of the bearing and split bushing to the shank of the hook, and FIG. 6 is a perspective view showing the assembly of the bearing, split bushing and hook to the casing of the hoist.

Referring to the drawings, and in particular to FIGS. 1 and 2, the swivel hook arrangement of the invention is shown applied to a hand hoist 10 of the type having a power input portion 11 and a block portion 12. While the invention is described hereafter in connection with this type of hoist, it will be appreciated that the invention may be applied to hoists of various types and styles, including electrically operated and air operated hoists.

As the details of the operating structure of the hoist form no part of this invention, it is sufficient to merely point out that manual actuation of a handle 13 to rotate an operating shaft 14 in one direction results in lowering of the block 12 through a chain 15, while actuation of the handle 13 to rotate the shaft 14 in the opposite direction results in raising of the block 12.

In the drawings, the arrangement of the invention by which an anti-friction bearing of the ball or roller type may be utilized with a hook having an integral head formed on the end of the shank thereof is shown in connection with both the supporting hook 16 for the power input portion 11 of the hoist and the load hook 17 of the block member 12 of the hoist. Thus, a conventional anti-friction thrust bearing 18, having races 18a and 18b with balls 18c interposed between the races, is utilized with the hook 16 to reduce friction between the hook 16 and the casing 20 of the power input portion 11 and an anti-friction bearing 19, having races 19a and 19b with balls 19c interposed between the races, utilized with the hook 17 to reduce friction between the hook 17 and the casing 21 of the block portion 11. While the invention is shown utilized with both the hook 16 and the hook 17, it will be appreciated that the invention can be utilized with only one of the hooks.

The manner in which the anti-friction bearing 19 is assembled to the load hook 17, and the hook 17 and bearing 19 thereafter assembled to the casing 21 of the block 11 is illustrated in FIGS. 4, 5 and 6. Referring first to FIG. 4, the anti-friction bearing 19 has an inner diameter slightly larger than the integral head 22 of the shank portion 23 of the hook 17, and the anti-friction bearing 19 is first slipped over the head 22 onto the shank 23, as shown in FIG. 5. Next, two halves 24a and 24b of a flanged, split bushing 24 are applied to the shank 23 of the hook 17 below the head 22. In this connection, it is to be noted that the length of the shank 23 between the underside of the head 22 and a shoulder 25 formed between the shank 23 and the body of the hook 17 is slightly longer than the combined axial thickness of the anti-friction bearing 19 and the bushing 24, thereby permitting the application of the two halves of the split bearing 24 to the shank 23 after the anti-friction bearing 19 has been placed over the shank 23, as shown in FIG. 5.

The bushing 24, when the two halves are assembled, has an outer diameter slightly smaller than the inner diameter of the anti-friction bearing 19, and the bushing 24 is inserted into the space between the inner diameter of the anti-friction bearing 19 and the outer surface of the shank 23 to thereby hold the bearing 19 concentric with the axis of the shank 23, as shown in FIG. 6, and to also prevent separation of the two halves of the split bushing 24.

The inner diameter of the bushing 24, when its two halves are assembled, is substantially equal to that of the shank whereby the bushing closely fit the shank with the flange 24c thereof extending under the head 22 and over the race 19a of the bearing whereby thrust can be transmitted from the bearing to the integral head 22.

After the bearing 19 and the split bushing 24 have been assembled to the shank 23 of the hook 17, the hook, bearing and bushing are next assembled to the casing 21 of the block 12. In this connection, it is to be noted that the casing 21 is formed in two parts 21a and 21b, as shown in FIG. 2, and the two parts adapted to be secured together along a parting line 26 by suitable bolts 27.

As shown in FIG. 2, the opposed surfaces of the bottom walls 27 and 28 of the two halves 21a and 21b of the casing are formed with complementary semi-circular recesses 29 and 30 which together form a cylindrical opening having a diameter slightly larger than the shank 23 of the hook 17. The thickness of the bottom walls 27 and 28 of the halves 21a and 21b of the casing 21 are substantially equal to the distance between the shoulder 25 and the underside of the race 19b of the bearing 19 when the bearing 19 and bushing 24 are moved to the position shown in FIG. 6. While the bearing 19 and bushing 24 are held in the position shown in FIG. 6, the two halves of the casing 21 are applied to the hook 17, with shank of the hook 23 between the race 19b and the shoulder 25 received in the recesses 29 and 30 formed in the opposed surfaces of the bottom walls of the halves 21a and 21b of the casing 21, as shown in FIG. 1. The two halves 21a and 21b of the casing 21 are then secured together by the bolts 27 whereby the bottom walls 27 and 28 of the halves 21a and 21b of the casing 21 lock the bushing 24 against axial displacement from the bearing 19.

Similarly, the casing 20 of the power input portion 11 of the hoist is formed in two parts 20a and 20b which are adapted to be bolted together along parting line 31 by bolts 32, as shown in FIG. 2, and the bearing 18 is locked to the shank 33 of the hook 16 by a split bushing 34 in the same manner as described in connection with the hook 17.

From the preceding description it can be seen that there is provided a simple, inexpensive arrangement whereby an anti-friction bearing may be used with a hook having an integral head formed on the end of the shank thereof, and the bearing and hook quickly and easily assembled to the casing. While the bearing is shown as a ball bearing in the drawings, it will be appreciated that the bearing could be a roller bearing.

I now claim:

1. In a hoist, a casing formed in two parts, means for securing said two parts together, complementary recesses formed in the surfaces of opposed walls of said two parts forming a cylindrical opening through the casing when said two parts are secured together, a hook, said hook having an integral shank portion forming a shoulder at one end with the hook and provided with an integral head of larger diameter at the other end, said shank being of slightly smaller diameter than said cylindrical opening and being received in said cylindrical opening with the hook extending exteriorly of the casing, an annular anti-friction bearing having rolling anti-friction elements surrounding said shank in the interior of said casing, said anti-friction bearing having an inner diameter slightly larger than the outer diameter of said integral head of said shank whereby said anti-friction bearing may be slipped over said head, a split flanged bushing surrounding said shank and extending into the space between the inner diameter of said bearing and the outer surface of said shank with the flange of said bushing extending under the integral head of said shank over the side of said anti-friction bearing adjacent said integral head whereby thrust may be transmitted from said bearing to said integral head, the axial length of said shank between said shoulder and said integral head being slightly greater than the combined axial thicknesses of said bearing and said bushing whereby said bushing may be applied to said shank after said bearing has been applied to said shank, and the thickness of the opposed wall portions of said parts of said casing surrounding said recesses being of a thickness to prevent axial displacement of said bushing from said bearing when said shank is received in said cylindrical opening formed by said recesses and said parts are secured together.

2. In a hoist, a casing formed in two parts, means for securing said two parts together, complementary recesses formed in the surfaces of opposed walls of said two parts forming a cylindrical opening through the casing when said two parts are secured together, a hook, said hook having an integral shank portion forming a shoulder with the hook at one end and provided with an integral head of larger diameter at the other end, said shank being of slightly smaller diameter than said cylindrical opening and being received in said cylindrical opening with the hook extending exteriorly of the casing, an annular anti-friction bearing having rolling anti-friction elements surrounding said shank in the interior of said casing, said anti-friction bearing having an inner diameter slightly larger than the outer diameter of said cylindrical head and said shank whereby said anti-friction bearing may be slipped over said head, a bushing having a flange at one end, said bushing having an inner diameter substantially equal to that of said shank and an outer diameter slightly smaller than the inner diameter of said bearing, said flange of said bushing having an outer diameter substantially larger than the inner diameter of said bearing, said bushing being split axially into at least two parts whereby said bushing may be applied to said shank, said bushing surrounding said shank and extending into the space between the inner diameter of said bearing and the outer surface of said shank whereby to hold said bearing concentric with said shank and to hold said parts of said bushing assembled, said flange of said bushing extending under the integral head of said shank and over the side of said anti-friction bearing adjacent said integral head whereby thrust may be transmitted from said bearing to said integral head, the axial length of said shank between said shoulder and said integral head being slightly greater than the combined axial thicknesses of said bearing and said bushing whereby said bushing may be applied to said shank after said bearing has been applied to said shank, and the thickness of the opposed wall portions of said parts of said casing surrounding said recesses being of a thickness to prevent axial displacement of said bushing from said bearing when said shank is received in said cylindrical opening formed by said recess and said parts secured together.

References Cited by the Examiner

UNITED STATES PATENTS

| 1,454,587 | 5/1923 | Gunn | 287—91 X |
| 2,625,005 | 1/1953 | Myers | 294—82 X |

GERALD M. FORLENZA, *Primary Examiner.*